(12) United States Patent
Sakatani et al.

(10) Patent No.: US 6,673,331 B2
(45) Date of Patent: Jan. 6, 2004

(54) TITANIUM HYDROXIDE, PHOTOCATALYST, AND COATING AGENT

(75) Inventors: Yoshiaki Sakatani, Niihama (JP); Hiroyuki Ando, Niihama (JP); Hironobu Koike, Niihama (JP)

(73) Assignee: Sumitomo Chemical Company, Limited, Osaka (JP)

( * ) Notice: Subject to any disclaimer, the term of this patent is extended or adjusted under 35 U.S.C. 154(b) by 202 days.

(21) Appl. No.: 10/026,000

(22) Filed: Dec. 21, 2001

(65) Prior Publication Data

US 2002/0132734 A1 Sep. 19, 2002

(30) Foreign Application Priority Data

Dec. 25, 2000 (JP) .......................... 2000-392261

(51) Int. Cl.[7] .............................. C01G 23/04
(52) U.S. Cl. ....................... 423/608; 502/350
(58) Field of Search ................ 423/608; 502/350

(56) References Cited

U.S. PATENT DOCUMENTS 5,011,674 A 4/1991 Yoshimoto et al.

FOREIGN PATENT DOCUMENTS

| EP | 1 065 169 A1 | 1/2001 |
| EP | 1 095 908 A1 | 5/2001 |
| EP | 1 138 634 A1 | 10/2001 |

OTHER PUBLICATIONS

S. Sato, "Photocatalyst Activity of NO Doped $TiO_2$ In The Visible Light Region", Chemical Physics Letter, vol. 123, No. 1,2, Oct. 22, 1985, pp. 126–128.

*Primary Examiner*—Stanley S. Silverman
*Assistant Examiner*—Edward M. Johnson
(74) *Attorney, Agent, or Firm*—Sughrue Mion, PLLC

(57) ABSTRACT

A titanium hydroxide is provided which can be utilized for producing a photocatalyst exhibiting a superior photocatalytic activity by irradiation of visible light. The titanium hydroxide has a primary differential spectrum (of radial structure function in connection with titanium K absorption edge) having maximal intensities ($U_1$ and $U_2$) and minimal intensities ($L_1$ and $L_2$) at interatomic distances in the range of from 1.4 Å to 2.8 Å, the maximal intensities being at an interatomic distance of from 1.4 Å to 1.7 Å and of from 2.2 Å to 2.5 Å and the minimal intensities being at an interatomic distance of from 1.9 Å to 2.2 Å and of from 2.5 Å to 2.8 Å; and index X calculated by the equation $X=(U_2-L_2)/(U_1-L_1)$ of about 0.06 or more.

11 Claims, 3 Drawing Sheets

TITANIUM HYDROXIDE, PHOTOCATALYST, AND COATING AGENT

FIELD OF THE INVENTION

The present invention relates to a titanium hydroxide, photocatalyst obtainable from the titanium hydroxide and a coating agent comprising the titanium hydroxide.

BACKGROUND OF THE INVENTION

It has been researched that organic materials in water or NOx in air is decomposed and removed by a photocatalytic activity of photocatalyst such as a specific titanium oxide. In these days, it has been attracting an attention of researchers to decompose and remove such things using visible light as a light source in the point of general purpose and usage and it has been desired to develop a photocatalyst which exhibits a superior photocatalytic activity by irradiation of visible light.

Heretofore, the titanium oxide which can be used as a photocatalyst has been produced by calcining a titanium hydroxide, which may be commercially available. However, there are problems such that the photocatalyst obtained by calcining the commercially available titanium hydroxide does not show a sufficiently high photocatalytic activity by irradiation of visible light.

SUMMARY OF THE INVENTION

Objects of the present invention are to provide a titanium hydroxide, which may be suitable as a raw material for producing a titanium oxide which exhibits a sufficiently high photocatalytic activity by irradiation of visible light, and to provide a coating agent comprising the titanium hydroxide. Other objects of the present invention are to provide a photocatalyst obtainable from the titanium hydroxide and to provide a simple process for producing a titanium oxide which is suitable for photocatalyst usage.

The present inventors have undertaken extensive studies on a raw material for such a titanium oxide which is suitable for photocatalyst usage, and have completed the present invention.

Thus, the present invention provides a titanium hydroxide having:

(i) a primary differential spectrum of radial structure function obtained from an extended X-ray absorption fine structure spectrum of titanium K absorption edge, the primary differential spectrum having two or more maximal intensities and two or more minimal intensities at interatomic distances in the range of from 1.4 Å to 2.8 Å, at least two maximal intensities being at an interatomic distance of from 1.4 Å to 1.7 Å and at an interatomic distance of from 2.2 Å to 2.5 Å, respectively, and at least two minimal intensities being at an interatomic distance of from 1.9 Å to 2.2 Å and at the interatomic distance of from 2.5 Å to 2.8 Å, respectively; and (ii) index X calculated by the equation:

$$X=(U_2-L_2)/(U_1-L_1)$$

of about 0.06 or more, wherein $U_1$ and $U_2$ represent the maximal-intensity values at the interatomic distance of from 1.4 Å to 1.7 Å and at the interatomic distance of from 2.2 Å to 2.5 Å, respectively, and $L_1$ and $L_2$ represent the minimal-intensity values at the interatomic distance of from 1.9 Å to 2.2 Å and at the interatomic distance of from 2.5 Å to 2.8 Å, respectively, of the primary differential spectrum.

In addition, the present invention provides a coating agent comprising the above-mentioned titanium hydroxide and a solvent.

Furthermore, the present invention provides a photocatalyst obtainable from the above-mentioned titanium hydroxide and a process for producing the photocatalyst by calcining the titanium hydroxide or subjecting the titanium hydroxide to a hydrothermal treatment in the presence of a solvent.

DETAILED DESCRIPTION OF THE INVENTION

Figure 1:
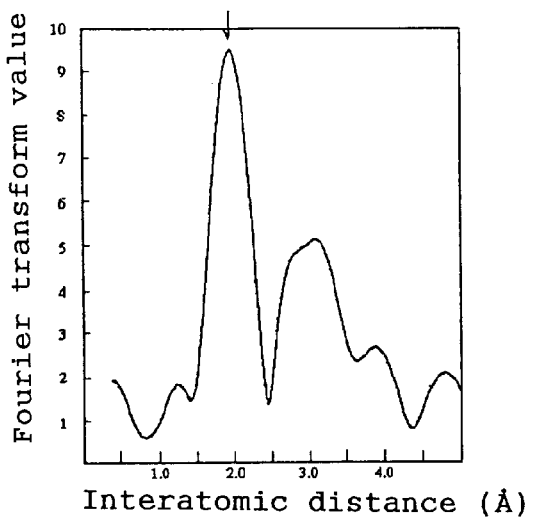
FIG. 1 shows a radial structure function of anatase-type titanium oxide.

A titanium hydroxide of the present invention may be represented by the chemical formula $Ti(OH)_2$, $Ti(OH)_3$, $Ti(OH)_4$ or $H_4TiO_4$, and may have a specific fine structure around titanium atom thereof. In the present invention, an extended X-ray absorption fine structure spectrum of titanium K absorption edge of a titanium hydroxide is measured by X-ray absorption fine structure analysis (hereinafter, referred to as "XAFS"). Then, Fourier transform of the extended X-ray absorption fine structure spectrum is conducted to obtain a radial structure function of the titanium hydroxide. The radial structure function is then differentiated to obtain a primary differential spectrum thereof. The primary differential spectrum thus obtained can be used as an index that shows a fine structure around titanium atom of the titanium hydroxide.

The titanium hydroxide of the present invention has a primary differential spectrum which has two or more maximal intensities and two or more minimal intensities at interatomic distances in the range of from 1.4 Å to 2.8 Å. Among these intensities, at least one maximal intensity is at an interatomic distance of from 1.4 Å to 1.7 Å, at least one maximal intensity is at an interatomic distance of from 2.2 Å to 2.5 Å, at least one minimal intensity is at an interatomic distance of from 1.9 Å to 2.2 Å and at least one minimal intensity is at the interatomic distance of from 2.5 Å to 2.8 Å.

In addition, the titanium hydroxide of the present invention has index X calculated by the equation:

$$X=(U_2-L_2)/(U_1-L_1)$$

of about 0.06 or more, wherein $U_1$ and $U_2$ represent the maximal-intensity values at the interatomic distance of from 1.4 Å to 1.7 Å and at the interatomic distance of from 2.2 Å to 2.5 Å, respectively, and $L_1$ and $L_2$ represent the minimal-intensity values at the interatomic distance of from 1.9 Å to 2.2 Å and at the interatomic distance of from 2.5 Å to 2.8 Å, respectively, of the primary differential spectrum. When a titanium hydroxide has index X of less than about 0.06, the titanium oxide obtained by calcining the titanium hydroxide in air tends to show insufficient photocatalytic activity by irradiation of visible light, even if the titanium hydroxide has maximal intensities at the interatomic distance of from 1.4 Å to 1.7 Å and at the interatomic distance of from 2.2 Å to 2.5 Å and has minimal intensities at the interatomic distance of from 1.9 Å to 2.2 Å and at the interatomic distance of from 2.5 Å to 2.8 Å in the its primary differential spectrum. A titanium hydroxide that has a larger index X is preferred. More preferably, the titanium hydroxide has an index X of about 0.1 or more.

The titanium hydroxide in the present invention preferably has a maximal Fourier-transform value of radial structure function at an interatomic distance in the range of from 1.5 Å to 2.2 Å, the maximal value being about 40% or less based on the maximal Fourier-transform value of radial structure function of the titanium oxide having an anatase structure, while the radial structure function of the titanium hydroxide is obtained by Fourier-transform of the extended X-ray absorption fine structure spectrum (which is obtained with XAFS) of titanium K absorption edge of the titanium hydroxide.

In addition, the titanium hydroxide in the present invention preferably contains a sulfur compound in an amount of from about 0.02% by weight to about 30% by weight, more preferably in an amount of about 0.1% by weight to about 30% by weight, in terms of sulfur atom based on the weight of the titanium compound obtained after calcining the titanium hydroxide in air at about 400° C.

The titanium hydroxide in the present invention, which has the above-described fine structure around titanium atom, may be obtained, for example, in a process which comprises the steps of concentrating an aqueous solution of oxy titanium sulfate using evaporator at 95° C. or lower to obtain a solid oxy titanium sulfate having a concentration of about 50% by weight or higher in terms of $TiOSO_4$ and adding a base such as an aqueous solution of ammonia (ammonia water) into the obtained solid oxy titanium sulfate under cooling to obtain the resulting titanium hydroxide in the mixture. The titanium hydroxide thus obtained may be separated from the mixture, and then is washed and dried, if necessary. The separation may be conducted by centrifugal separation, decantation, filtration or the like. The drying may be carried out using an air dryer, a media fluidized dryer, a static dryer or the like. Alternatively, the mixture containing the titanium hydroxide itself may be utilized without separation as a titanium hydroxide slurry after removing impurities therein with an ion exchange membrane or an ion exchange resin.

The titanium hydroxide in the present invention may be subjected to a mold processing. Examples of the shape of such a molded titanium hydroxide include particulate shape, fibrous shape, thin-layer shape and the like. Alternatively, the mold processing may be conducted to provide the titanium hydroxide with a specific surface shape in a method of dispersing a titanium hydroxide in a solvent such as water, an alcohol and hydrogen peroxide to obtain a slurry, applying the slurry onto an uneven surface of a plate such as a metal plate and drying the slurry. By calcining the molded titanium hydroxide, a titanium oxide having a designated shape can be easily obtained. For example, when a fibrous-shaped titanium hydroxide is calcined, a fibrous-shaped titanium oxide is easily provided. When a thin-layer-shaped titanium hydroxide is calcined, a thin-layer-shaped titanium oxide is easily provided.

A coating agent in the present invention comprises the titanium hydroxide which has the above-described fine structure around titanium atom, and a solvent.

The solvent in the coating agent is not particularly limited. Preferred are those which hardly remain as it is or in its calcined form on the resulting titanium oxide obtained after calcining the titanium hydroxide. Examples of the solvent include water; acids such as hydrochloric acid, nitric acid, sulfuric acid and oxalic acid; hydrogen peroxide; bases such as ammonia, sodium hydroxide, potassium hydroxide; alcohols; and ketones.

The coating agent of the present invention may contain inorganic compounds other than the titanium hydroxide, such as silica, alumina, zirconia, magnesia, zinc oxide, iron oxide, tungsten oxide, niobium oxide, titanium oxide, titanium peroxide, zeolite and molecular sieves, calcium phosphate; a dispersant; a binder; a polymer resin; and/or titanium hydroxides other than that of the present invention etc, as long as such compounds do not impair the photocatalytic activity of the titanium oxide obtained after calcining the coating agent.

The coating agent may be produced in a process which comprises the steps of dispersing the titanium hydroxide (and the above-described compounds, if needed) in the above-described solvent to form a slurry or solution.

The slurry comprising the titanium oxide and the solvent may be calcined to obtain a molded titanium oxide, i.e., a molded photocatalyst.

A photocatalyst in the present invention may be produced by transferring the titanium hydroxide of the present invention, which has the above-described fine structure around titanium atom, to a titanium oxide. The transferring of the titanium hydroxide to the titanium oxide may be conducted by a method in which the titanium hydroxide is calcined, or by a method in which the titanium hydroxide is subjected to a hydrothermal treatment in the presence of a solvent (such as water, alcohols and aromatic compounds) to obtain a slurry of the resulting titanium oxide.

In calcination of the titanium hydroxide, the temperature for calcining is not limited, as long as a titanium hydroxide is transferred to a titanium oxide at the temperature. The temperature may be about 300° C. or higher, preferably about 350° C. or higher, and may be about 600° C. or lower, preferably about 500° C. or lower. When the temperature of calcination is too high, the photocatalytic activity of the photocatalyst obtained after the calcination tends to decrease. A molded titanium hydroxide, which can be obtained by the molding process as described above, may be calcined to obtain a molded titanium oxide.

The calcination of the titanium hydroxide may be conducted using a current calcination furnace, a tunnel furnace or a rotary kiln, etc.

The photocatalyst in the present invention may be used by a method, for example, in which the photocatalyst and a liquid or gaseous material (i.e., a material to be treated with the photocatalyst) are placed in a glass vessel or tube which is capable of transmitting visible light, and then are irradiated with visible light from a light source, so that the material is oxidized or reduced and/or decomposed. The light source is not particularly limited, as long as it irradiates light containing visible light having a wavelength of 430 nm or longer and/or ultraviolet light. Examples of the light source include sunlight, a fluorescent lamp, a halogen lamp, a black light, a xenon lamp, a mercury lamp, a sodium lamp, LED and the like. If desired, the light source may be equipped with an ultraviolet cut-off filter and/or an infrared cut-off filter.

An irradiation time with visible light is not particularly limited, and may be selected appropriately depending on a intensity of light from a light source, and a kind and amount of a material to be treated with the photocatalyst.

As described above, the titanium hydroxide of the present invention can be utilized as a raw material for producing a photocatalyst which exhibits a superior photocatalytic activity by irradiation of visible light. The photocatalyst produced from the titanium hydroxide can decompose a variety of organic materials such as carboxylic acids, aldehyde, alcohols and aromatic compounds. The coating agent in the present invention makes it possible to easily apply the titanium hydroxide of the present invention onto a material such as a resin, a metal, a ceramics and a glass as well as to provide such a material with a high photocatalytic activity by calcination after the applying. In accordance with the process for producing a photocatalyst, it is easy to obtain a photocatalyst (titanium oxide) which exhibits a superior photocatalytic activity with radiation of visible light.

The titanium hydroxide, the coating agent, the photocatalyst and the process for producing a photocatalyst, each of which is in the present invention, are described in Japanese application no. 2000-392261, filed on Dec. 25, 2000, the complete disclosures of which are incorporated herein by reference.

The invention being thus described, it will be apparent that the same may be varied in many ways. Such variations are to be regarded as within the spirit and scope of the invention, and all such modifications as would be apparent to one skilled in the art are intended to be within the scope of the following claims.

EXAMPLE

The present invention is described in more detail by following Examples, which should not be construed as a limitation upon the scope of the present invention.

A radial structure function, a primary differential spectrum thereof and a sulfur content, of a titanium hydroxide or the like, were obtained using the methods described below, and catalytic activity of a photocatalyst (titanium oxide) was evaluated as follows.

Radial Structure Function and Primary Differential Spectrum:

A sample (for example, titanium hydroxide) (1 part by weight) was mixed with boron nitride (BN) (99 parts by weight). The obtained mixture (about 80 mg) was molded under a molding pressure of 500 kgf/cm$^2$ to obtain a tablet of the sample. Using the tablet, an extended X-ray absorption fine structure spectrum of titanium K absorption edge of the sample was measured with applying beam line BL-9A of Photon Factory KEK-PF and using a monochromator crystal Si (111) in a transmission method in a measurement range of Ti-K edge (4600 to 5500 eV). The measurement was conducted with dividing the whole measurement range into four ranges, i.e., 4600–4950 eV, 4950–5000 eV, 5000–5050 eV and 5050–5500 eV under the conditions shown in Table 1.

TABLE 1

| Range | Initial Energy | Final Energy | Step/eV | Time/s | Measurement Number |
|---|---|---|---|---|---|
| 1 | 4600 | 4950 | 10.0 | 1.0 | 35 |
| 2 | 4950 | 5000 | 0.5 | 1.0 | 100 |
| 3 | 5000 | 5050 | 1.0 | 1.0 | 50 |
| 4 | 5050 | 5500 | 3.0 | 2.0 | 151 |

The extended X-ray absorption fine structure spectrum was then subjected to Fourier transform using an analysis software (trade name: "REX-1", manufactured by Rigaku Corporation), to obtain a radial structure function of the sample. The Fourier transform was conducted under the condition in that χ0 (EXAFS oscillating center) is decided in Cubic Spline method, k (Å$^{-1}$; wave number vector)-weighting: 3 and Fourier transform range of χ(k) curve of 3–11 (Å).

The above-obtained radial structure function was differentiated using analysis software (trade name: "OMNIC", produced by Nicolay company), to obtain a primary differential spectrum of the sample.

Maximal Fourier-transform value of the radial structure function of a sample titanium hydroxide at an interatomic distance in the range of from 1.5 Å to 2.2 Å was evaluated by comparison with that of a commercially available titanium oxide ($TiO_2$, produced by Wako Pure Chemical Industries) having an anatase structure. That is; the radial structure function of the commercially available titanium oxide were obtained in the same manner as described above, which is shown in FIG. 1. Maximal Fourier-transform value of the radial structure function of the titanium oxide at an interatomic distance in the range of from 1.5 Å to 2.2 Å is obtained to be 9.5, which is used for the standard of the comparison.

Sulfur Content:

In accordance with a method JCRS-104-1993, which is defined by Ceramic Society of Japan, a sulfur content $S_0$ (% by weight) of a sample titanium hydroxide was measured in terms of sulfur atom. The sample titanium hydroxide (in the same amount as used for measuring the sulfur content $S_0$) was calcined at 400° C. in air, and then the weight W of the calcined compound was measured. The sulfur content S (% by weight) was calculated as below;

$$S = S_0/W$$

Evaluation of Photocatalytic Activity of Titanium Oxide (or Photocatalyst):

In a sealed-type glass reaction vessel (diameter: 8 cm, height: 10 cm, volume: about 0.5 L), was placed a 5-cm diameter glass Petri dish on which 0.3 g of a titanium oxide (photocatalyst) to be evaluated was placed. The reaction vessel was filled with a mixed gas having 20% by weight of oxygen and 80% by weight of nitrogen, was sealed with 13.4 μm of acetaldehyde and then was irradiated with visible light from outside of the vessel. The irradiation was carried out using a 500W xenon lamp as the light source (trade name: Optical Modulex SX-UI500XQ, made by USHIO INC.) equipped with a 500 W xenon lamp (trade name: UXL-500SX, made by USHIO INC.), an ultraviolet cutting filter (trade name: Y-45, made by Asahi Techno Glass Co., Ltd.) cutting off ultraviolet light having a wavelength of about 430 nm or shorter and an infrared light cutting filter (made by USHIO INC., trade name: Supercold Filter) cutting off infrared light having a wavelength of about 830 nm or longer. When the acetaldehyde in the vessel is decomposed by visible light irradiation, carbon dioxide is generated. The concentration of the generated carbon dioxide was measured with passage of time using a photoacoustic multi-gas monitor (type: 1312, made by INNOVA). With the generation rate of carbon dioxide, which was calculated by the change of the carbon dioxide concentration, the photocatalytic activity of the titanium oxide (photocatalyst) for acetaldehyde was evaluated.

Example 1

In a 1-liter volume flask, 214 g of water was placed, and 120 g of titanium oxysulfate (manufactured by SOEKAWA CHEMICAL CO., LTD.) was added therein and mixed with each other while stirring, to obtain a solution. From the resulting solution, water was evaporated off with evaporator at 70° C. to obtain a mixture having a concentration of 62.5% by weight in terms of $TiOSO_4$. The mixture was placed into a flask. Into the flask, 907 g of a 25% by weight of aqueous ammonia solution (special grade; manufactured by Wako Pure Chemical Industries, Ltd.) was added dropwise over 10 seconds while cooling with a refrigerant at −30° C., thereby precipitating a solid. The solid was separated from the mixture by filtration, was washed with water and was dried at 70° C. to obtain a titanium hydroxide.

Figure 2:
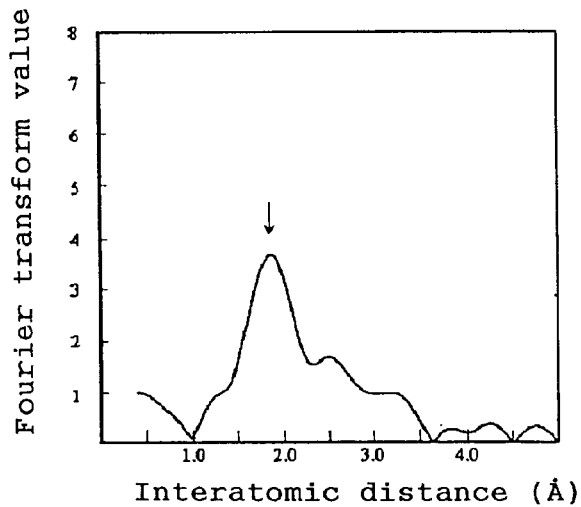
FIGS. 2 and 3 show the radial structure function of the titanium hydroxide, which was obtained in the present invention (see, Example 1), and the primary differential spectrum thereof, respectively.
Figure 3:
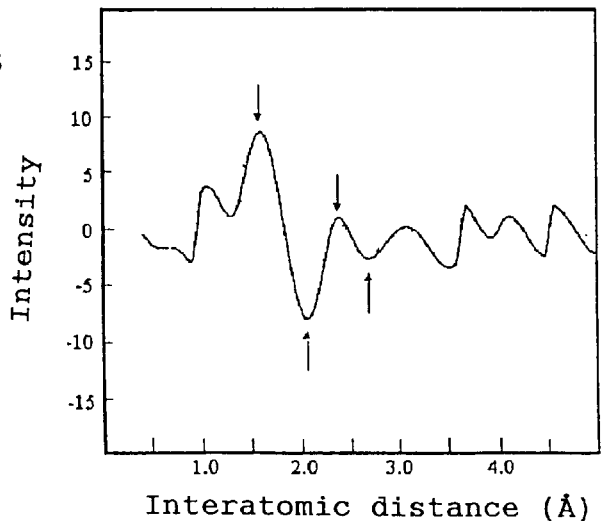

The radial structure function of the titanium hydroxide and the primary differential spectrum thereof were obtained and are shown in FIGS. 2 and 3, respectively.

The interatomic distances at which a maximal or minimal intensity is observed in the primary differential spectrum; the maximal-intensity values and minimal-intensity values; and index X are shown in Table 2, respectively. The maximal Fourier-transform value of the radial structure function at an interatomic distance in the range of from 1.5 Å to 2.2 Å is shown in Table 3. In addition, sulfur content of the titanium hydroxide is shown in Table 4.

The titanium hydroxide obtained above was calcined at 400° C. in air for one hour to obtain a particulate titanium oxide. The photocatalytic activity of the titanium oxide was evaluated. As a result, the generation rate of carbon dioxide was 153.58 μmol/h per gram of the titanium oxide.

Example 2

In a 300 ml volume flask, 60 g of water was placed, and 90 g of titanium oxysulfate (manufactured by SOEKAWA CHEMICAL CO., LTD.) was added therein and mixed with each other while stirring, to obtain a solution. From the resulting solution, water was evaporated off with evaporator at 70° C. to obtain a mixture having a concentration of 59.2% by weight in terms of $TiOSO_4$. The mixture was placed into a flask. Into the flask, 414 g of a 25% by weight of aqueous ammonia solution (special grade; manufactured by Wako Pure Chemical Industries, Ltd.) was added dropwise over 8 seconds while cooling with a refrigerant at −30° C., thereby precipitating a solid. The solid was separated from the mixture by filtration, was washed with water and was dried at 70° C. to obtain a titanium hydroxide.

Figure 4:
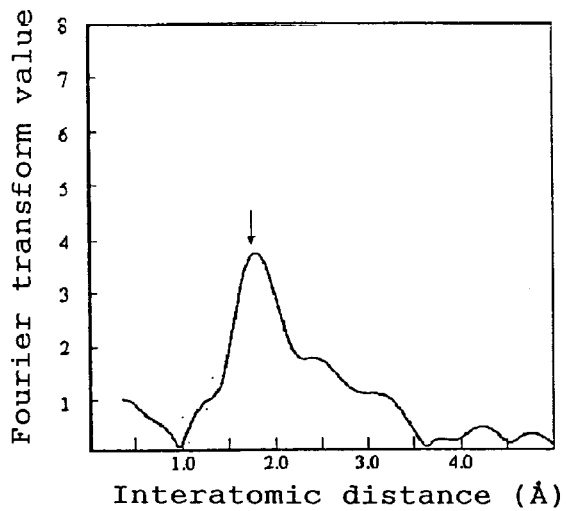
FIGS. 4 and 5 show the radial structure function of the titanium hydroxide, which was obtained in the present invention (see, Example 2), and the primary differential spectrum thereof, respectively.
Figure 5:
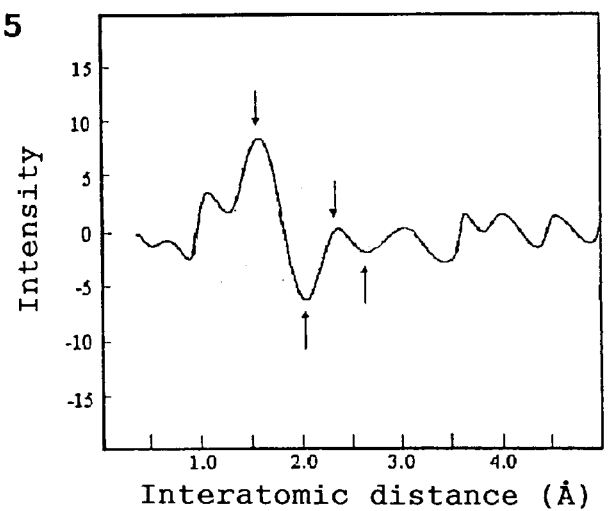

The radial structure function of the titanium hydroxide and the primary differential spectrum thereof were obtained and are shown in FIGS. 4 and 5, respectively.

The interatomic distances at which a maximal or minimal intensity value is observed in the primary differential spectrum; the maximal-intensity values and minimal-intensity values; and index X are shown in Table 2, respectively. The maximal Fourier-transform value of the radial structure function at an interatomic distance in the range of from 1.5 Å to 2.2 Å is shown in Table 3. In addition, a sulfur content of the titanium hydroxide is shown in Table 4.

The titanium hydroxide obtained above was calcined at 400° C. in air for one hour to obtain a titanium oxide. The photocatalytic activity of the titanium oxide was evaluated. As a result, the generation rate of carbon dioxide was 29.49 μmol/h per gram of the titanium oxide.

Comparative Example 1

A commercially available titanium hydroxide (trade name: "α-titanium hydroxide", produced by Kishida Chemical Co., Ltd.) was calcined without any treatment at 400° C. in air for one hour to obtain a titanium oxide. The photocatalytic activity of the titanium oxide was evaluated. As a result, the generation rate of carbon dioxide was 5.15 μmol/h per gram of the titanium oxide.

Figure 6:
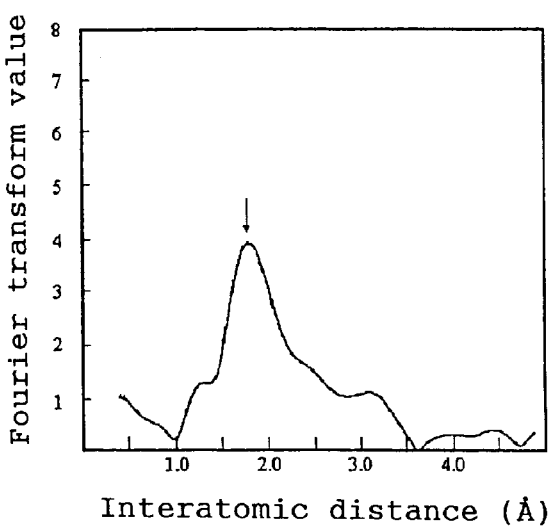
FIGS. 6 and 7 show the radial structure function of the commercially available titanium hydroxide (utilized in Comparative Example 1), and the primary differential spectrum thereof, respectively.
Figure 7:
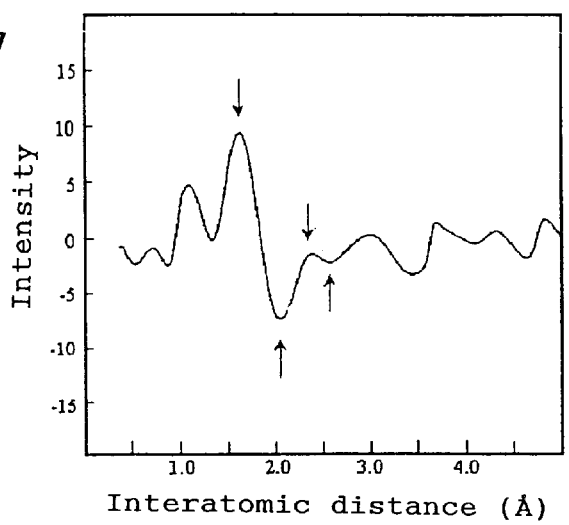

The radial structure function of the titanium hydroxide utilized for calcination and the primary differential spectrum thereof were obtained and are shown in FIGS. 6 and 7, respectively.

The interatomic distances at which a maximal or minimal intensity is observed in the primary differential spectrum; the maximal-intensity values and minimal-intensity values; and index X are shown in Table 2, respectively. The maximal Fourier-transform value of the radial structure function at an interatomic distance in the range of from 1.5 Å to 2.2 Å is shown in Table 3. In addition, a sulfur content of the titanium hydroxide is shown in Table 4.

Comparative Example 2

A commercially available titanium hydroxide (trade name: "β-titanium hydroxide", produced by Kishida Chemical Co., Ltd.) was calcined without any treatment at 400° C. in air for one hour to obtain a titanium oxide. The photocatalytic activity of the titanium oxide was evaluated. As a result, the generation rate of carbon dioxide was 1.91 μmol/h per gram of the titanium oxide.

Figure 8:
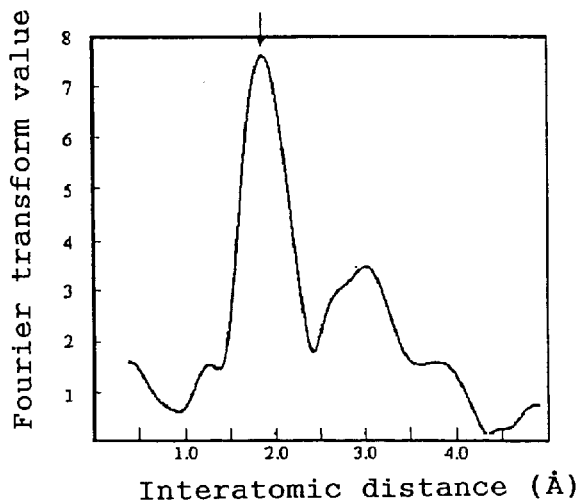
FIGS. 8 and 9 show the radial structure function of the commercially available titanium hydroxide (utilized in Comparative Example 2), and the primary differential spectrum thereof, respectively.
Figure 9:
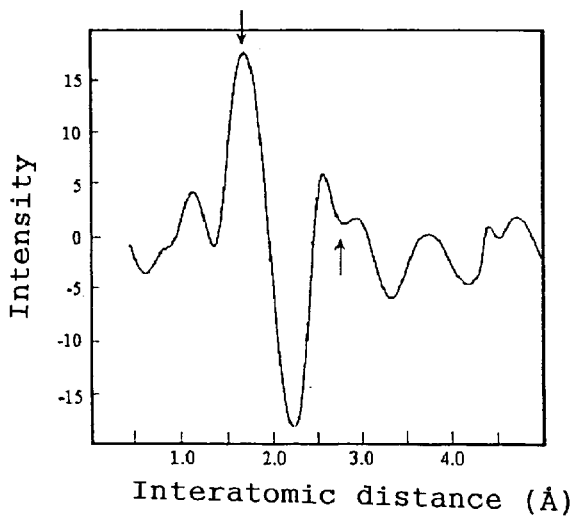

The radial structure function of the titanium hydroxide utilized for calcination and the primary differential spectrum thereof were obtained and are shown in FIGS. 8 and 9, respectively.

The interatomic distances at which a maximal or minimal intensity is observed in the primary differential spectrum; the maximal-intensity values and minimal-intensity values; and index X are shown in Table 2, respectively. The maximal Fourier-transform value of the radial structure function at an interatomic distance in the range of from 1.5 Å to 2.2 Å is shown in Table 3. In addition, a sulfur content of the titanium hydroxide is shown in Table 4.

TABLE 2

|  | Example 1 | Example 2 | Comparative Example 1 | Comparative Example 2 |
|---|---|---|---|---|
| Interatomic distances at which a maximal intensity is observed (Å) | 1.58 2.39 | 1.58 2.38 | 1.61 2.39 | 1.64 2.54 |
| Interatomic distances at which a minimal intensity is observed (Å) | 2.08 2.69 | 2.07 2.66 | 2.08 2.58 | 2.24 2.76 |
| Maximal-intensity value $U_1$ at the interatomic distance in he range of from 1.4 Å to 1.7 Å | 8.11 | 8.06 | 8.97 | 17.34 |

TABLE 2-continued

|  | Example 1 | Example 2 | Comparative Example 1 | Comparative Example 2 |
|---|---|---|---|---|
| Maximal-intensity value $U_2$ at the interatomic distance in the range of from 2.2 Å to 2.5 Å | 1.10 | −0.02 | −1.23 | — |
| Minimal-intensity value $L_1$ at the interatomic distance in the range of from 1.9 Å to 2.2 Å | −7.42 | −6.47 | −6.93 | — |
| Minimal-intensity value $L_2$ at the interatomic distance in the range of from 2.5 Å to 2.8 Å | −2.37 | −2.03 | −1.97 | 1.37 |
| Index X [= $(U_2 − L_2)/(U_1 − L_1)$] | 0.22 | 0.14 | 0.05 | — |

TABLE 3

|  | Example 1 | Example 2 | Comparative Example 1 | Comparative Example 2 |
|---|---|---|---|---|
| Maximal Fourier-transform value $A_1$ of the radial structure function at an interatomic distance in the range of from 1.5 Å to 2.2 Å | 3.7 | 3.7 | 4.0 | 7.6 |
| Relative value of maximal Fourier-transform value $A_1$ to that of anatase-type titanium oxide [= $A_1/9.5$] | 39 | 39 | 42 | 80 |

TABLE 4

|  | Example 1 | Example 2 | Comparative Example 1 | Comparative Example 2 |
|---|---|---|---|---|
| Sulfur content $S_0$ (% by weight) | 1.3 | 0.006 | 0.0032 | 0.0049 |
| Weight W obtained after calcined the titanium hydroxide at 400° C. in air in the same amount as used for measuring the sulfur content | 0.776 | 0.803 | 0.739 | 0.794 |
| Sulfur content S [= $S_0/W$] (% by weight) | 1.7 | 0.0075 | 0.0043 | 0.0062 |

What is claimed is:

1. A titanium hydroxide having
(i) a primary differential spectrum of radial structure function obtained from an extended X-ray absorption fine structure spectrum of titanium K absorption edge, the primary differential spectrum having two or more maximal intensities and two or more minimal intensities at interatomic distances in the range of from 1.4 Å to 2.8 Å, at least two maximal intensities being at an interatomic distance of from 1.4 Å to 1.7 Å and at an interatomic distance of from 2.2 Å to 2.5 Å, respectively, and at least two minimal intensities being at an interatomic distance of from 1.9 Å to 2.2 Å and at the interatomic distance of from 2.5 Å to 2.8 Å, respectively; and
(ii) index X calculated by the equation:

$$X=(U_2-L_2)/(U_1-L_1)$$

of about 0.06 or more, wherein $U_1$ and $U_2$ represent the maximal-intensity values at the interatomic distance of from 1.4 Å to 1.7 Å and at the interatomic distance of from 2.2 Å to 2.5 Å, respectively, and $L_1$ and $L_2$ represent the minimal-intensity values at the interatomic distance of from 1.9 Å to 2.2 Å and at the interatomic distance of from 2.5 Å to 2.8 Å, respectively, of the primary differential spectrum.

2. A titanium hydroxide according to claim 1, wherein the titanium hydroxide has a maximal Fourier-transform value of radial structure function at an interatomic distance in the range of from 1.5 Å to 2.2 Å, the maximal value being about 40% or less based on the maximal Fourier-transform value of radial structure function of the titanium oxide having an anatase structure.

3. The titanium hydroxide according to claim 1 or 2, wherein the titanium hydroxide contains a sulfur compound in an amount of from about 0.02% by weight to about 30% by weight in terms of sulfur atom based on the weight of the titanium compound obtained after calcining the titanium hydroxide in air at about 400° C.

4. A coating agent comprising a titanium hydroxide as claimed in any one of claims 1 to 2 and a solvent.

5. A photocatalyst obtainable by calcining a titanium hydroxide as claimed in any one of claims 1 to 2.

6. A process for producing a photocatalyst, which comprises a step of calcining a titanium hydroxide as claimed in any one of claims 1 to 2.

7. A process for producing a photocatalyst, which comprises a step of subjecting a titanium hydroxide as claimed in any one of claims 1 to 2 to a hydrothermal treatment in the presence of a solvent.

8. A coating agent comprising a titanium hydroxide as claimed in claim 3, and a solvent.

9. A photocatalyst obtainable by calcining a titanium hydroxide as claimed in claim 3.

10. A process for producing a photocatalyst, which comprises a step of calcining a titanium hydroxide as claimed in claim 3.

11. A process for producing a photocatalyst, which comprises a step of subjecting a titanium hydroxide as claimed in claim 3 to a hydrothermal treatment in the presence of a solvent.

* * * * *